United States Patent
Katsura et al.

(10) Patent No.: US 8,767,786 B2
(45) Date of Patent: Jul. 1, 2014

(54) LASER PROCESSING APPARATUS, LASER PROCESSING METHOD, AND MANUFACTURING METHOD OF PHOTOVOLTAIC DEVICE

(75) Inventors: Tomotaka Katsura, Tokyo (JP); Tatsuki Okamoto, Tokyo (JP); Kunihiko Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 343 days.

(21) Appl. No.: 13/140,073

(22) PCT Filed: Apr. 21, 2009

(86) PCT No.: PCT/JP2009/057917
§ 371 (c)(1),
(2), (4) Date: Jun. 16, 2011

(87) PCT Pub. No.: WO2010/070940
PCT Pub. Date: Jun. 24, 2010

(65) Prior Publication Data
US 2011/0287570 A1 Nov. 24, 2011

(30) Foreign Application Priority Data
Dec. 17, 2008 (JP) .................................. 2008-321555

(51) Int. Cl.
*H01S 3/04* (2006.01)
(52) U.S. Cl.
USPC ...................................... 372/43.01; 219/121.6
(58) Field of Classification Search
USPC .................. 372/43.01, 75; 219/121.18, 121.6, 219/121.8, 121.12, 121.76
See application file for complete search history.

(56) References Cited

U.S. PATENT DOCUMENTS

| 4,956,539 | A | 9/1990 | Uesugi et al. |
| 6,635,849 | B1 | 10/2003 | Okawa et al. |

(Continued)

FOREIGN PATENT DOCUMENTS

| EP | 1 043 110 A2 | 10/2000 |
| JP | 2001 259869 | 9/2001 |

(Continued)

OTHER PUBLICATIONS

International Search Report issued Aug. 4, 2009 in PCT/JP09/57917 filed Apr. 21, 2009.

(Continued)

*Primary Examiner* — Jack Chen
(74) *Attorney, Agent, or Firm* — Oblon, Spivak, McClelland, Maier & Neustadt, L.L.P.

(57) ABSTRACT

To provide a conveying unit that holds a workpiece and conveys the workpiece at a constant rate in one direction, a laser oscillator that emits a pulsed laser beam, a splitter that splits a pulsed laser beam into a pattern having a predetermined geometric pitch, a first deflector that scans the split pulsed laser beam in the other direction substantially orthogonal to the one direction, a second deflector that adjusts and deflects the split pulsed laser beam deflected by the first deflector on the surface to be processed in the one direction so as to scan the resultant pulsed laser beam onto the surface to be processed at a constant rate equal to a rate at which the workpiece is conveyed, and a condenser that condenses the split pulsed laser beam deflected by the second deflector onto the surface to be processed.

2 Claims, 8 Drawing Sheets

(56) References Cited

U.S. PATENT DOCUMENTS

| | | | |
|---|---|---|---|
| 6,800,237 | B1 | 10/2004 | Yamamoto et al. |
| 2011/0287570 | A1* | 11/2011 | Katsura et al. .................. 438/71 |

FOREIGN PATENT DOCUMENTS

| JP | 2002 111022 | 4/2002 |
|---|---|---|
| JP | 2008 12546 | 1/2008 |
| JP | 2008 227070 | 9/2008 |
| WO | 00 53365 | 9/2000 |

OTHER PUBLICATIONS

German Office Action issued Nov. 29, 2012, in Patent Application No. 11 2009 003 752.6 (with English-language translation).

* cited by examiner

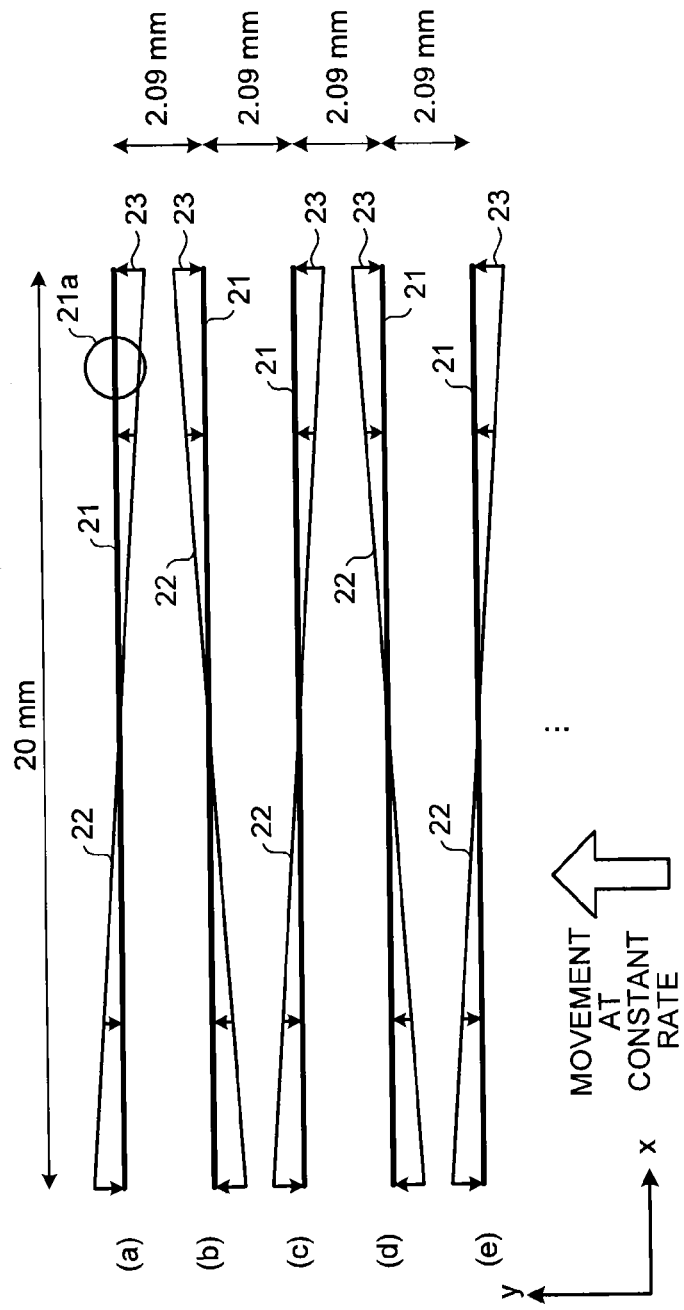

24.2 μm

LASER PROCESSING APPARATUS, LASER PROCESSING METHOD, AND MANUFACTURING METHOD OF PHOTOVOLTAIC DEVICE

FIELD

The present invention relates to a laser processing apparatus that irradiates a laser beam onto a workpiece to process the workpiece, a laser processing method, and a manufacturing method of a photovoltaic device.

BACKGROUND

Conventionally, laser processing apparatuses that irradiate a laser onto a workpiece to process the workpiece have been widely utilized. For example, there is a laser processing apparatus that has a workpiece conveying unit that conveys a workpiece and a laser-beam scanning unit that performs laser beam scanning. According to this laser processing apparatus, when a laser beam is scanned onto a workpiece by the laser-beam scanning unit while the workpiece is moved by the workpiece conveying unit at a constant rate in a certain direction to process the workpiece, an angle created by a laser-beam scanning direction and a conveying direction is changed according to a rate at which the workpiece is conveyed, so that a laser processing is performed linearly in a direction orthogonal to the conveying direction regardless of the rate at which the workpiece is conveyed (see, for example, Patent Literature 1).

CITATION LIST

Patent Literature

Patent Literature 1: Japanese Patent Application Laid-open No. 2001-259869

SUMMARY

Technical Problem

However, according to the conventional technique described above, when apertures aligned in a geometric periodic structure are formed by laser processing, it is difficult to form the apertures by precisely connecting periodic structures adjacent to each other at a connected part of geometric periodic structure units because of beam misalignment by a laser beam deflector and offset of synchronous control of laser scanning by the laser beam deflector, movement of a workpiece, and laser oscillation.

The present invention has been achieved in view of the above problems, and an object of the present invention is to provide a laser processing apparatus that can precisely form apertures aligned in a geometric periodic structure, a laser processing method, and a manufacturing method of a photovoltaic device.

Solution to Problem

In order to solve the aforementioned problems and attain the aforementioned object, a laser processing apparatus according to one aspect of the present invention is constructed in such a manner as to include: a workpiece conveying unit that holds a workpiece with a surface to be processed thereof facing upward and conveys the workpiece at a constant rate in one direction; a laser oscillator that emits a pulsed laser beam; a laser beam splitter that splits the pulsed laser beam emitted from the laser oscillator into a pattern of a laser beam having a predetermined geometric pitch; a first laser beam deflector that scans the pulsed laser beam split by the laser beam splitter in the other direction substantially orthogonal to the one direction on the surface to be processed; a second laser beam deflector that adjusts and deflects the split pulsed laser beam deflected by the first laser beam deflector in the one direction on the surface to be processed so as to scan a resultant laser beam onto the surface to be processed at a constant rate equal to a rate at which the workpiece is conveyed; and a condenser that condenses the split pulsed laser beam deflected by the second laser beam deflector onto the surface to be processed.

Advantageous Effects of Invention

According to the present invention, in laser processing for performing pulsed laser beam scanning simultaneously with the movement of a workpiece, a pulsed laser beam is split into a periodic pattern and the split pulsed laser beam is irradiated onto the workpiece. Therefore, apertures aligned in the periodic pattern at a precise pitch can be processed at a high speed.

BRIEF DESCRIPTION OF DRAWINGS

FIG. 7A is a schematic diagram for explaining a laser-beam irradiation method in a processable region according to the first embodiment of the present invention.

DESCRIPTION OF EMBODIMENTS

Figure 1:
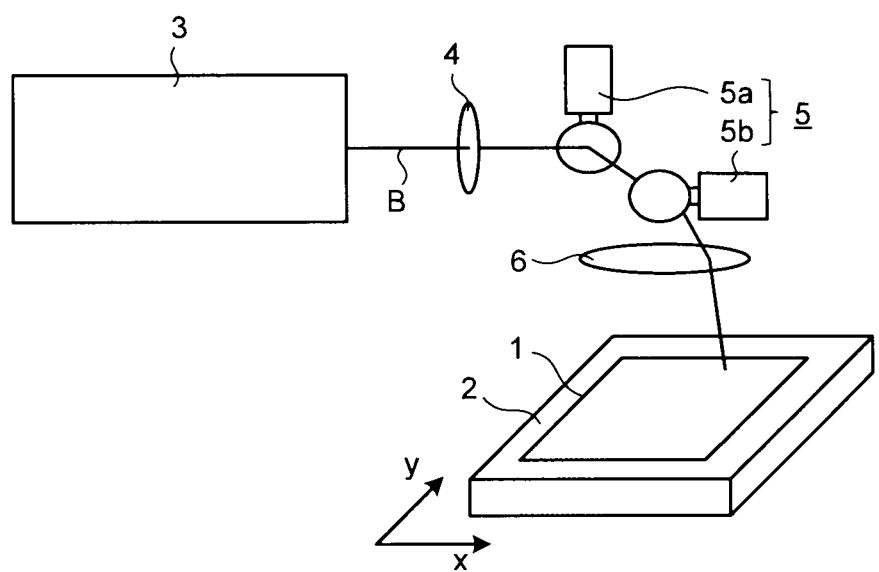
FIG. 1 is a schematic diagram for explaining a schematic configuration of a laser processing apparatus according to a first embodiment of the present invention.

Exemplary embodiments of a laser processing apparatus, a laser processing method, and a manufacturing method of a photovoltaic device according to the present invention will be explained below in detail with reference to the accompanying drawings. The present invention is not limited to the following descriptions and various modifications can be appropriately made without departing from the scope of the invention. In the drawings explained below, scales of respective members may be shown differently from those in practice to facilitate understanding, and the same applies to the relationships between the drawings.

First Embodiment

FIG. 1 is a schematic diagram for explaining a schematic configuration of a laser processing apparatus according to an embodiment of the present invention. The laser processing apparatus according to the present embodiment includes a workpiece conveying unit 2, a laser oscillator 3, a laser beam splitter 4, a laser beam deflector 5, and a condenser 6.

The workpiece conveying unit 2 holds a workpiece 1 with a surface to be processed thereof facing upward and moves the workpiece 1 at a constant rate in a fixed direction (y direction in FIG. 1).

The laser oscillator 3 emits a laser beam B. The laser oscillator 3 can use a third harmonic wave of a 100-kHz Q-switch LD-pumped Nd:YAG laser as its representative repetition frequency.

The laser beam splitter 4 splits the laser beam B emitted from the laser oscillator 3 into a periodic pattern of a laser beam having a predetermined geometric periodic structure. For example, a diffractive optical element can be used as the laser beam splitter 4. Although a mask with a plurality of apertures can be used as the laser beam splitter, the diffractive optical element is desirably used in view of beam uniformity and efficiency. The periodic pattern of the laser beam can be changed to any pattern.

The laser beam deflector 5 is constituted by a laser beam deflector 5a that adjusts a deflection direction in a first direction (x direction in FIG. 1) to deflect the laser beam B and a laser beam deflector 5b that adjusts the deflection direction in a second direction (y direction in FIG. 1) which is substantially orthogonal to the first direction on the surface to be processed to deflect and scan the laser beam B, and deflects the laser beam B split into a periodic pattern by the laser beam splitter 4 in the two directions substantially orthogonal to each other. A polygon mirror or a galvo-mirror is generally used as the laser beam deflector 5. While the polygon mirror is suitable for high speed scanning, it generally has six surfaces at most and thus the deflection angle of a laser beam is large. Accordingly, the polygon mirror is not efficient in laser beam scanning that the deflection angle of the laser beam B is small (processable region is narrow). In such a case, the galvo-mirror is used, so that a relatively narrow processable region can be processed efficiently.

The condenser 6 condenses the laser beam B deflected by the laser beam deflector 5b onto the surface to be processed of the workpiece 1. For example, an Fθ lens is used as the condenser 6. The condenser 6 is called Fθ lens 6.

Processing performed by the laser processing apparatus according to the present embodiment is explained by exemplifying a case of forming a texture structure on a surface (sunlight incident surface) of a polycrystalline silicon solar cell serving as a photovoltaic device. The texture structure is an uneven structure formed on the surface of a polycrystalline silicon substrate and is effective for suppressing reflected light. By forming the texture structure on the surface of the polycrystalline silicon solar cell, reflected light on the surface can be suppressed and a photoelectric conversion efficiency can be improved. Processing of forming the texture structure on the surface of a polycrystalline silicon solar cell in a manufacturing process of a polycrystalline silicon solar cell is explained with reference to FIGS. 2A to 2E. FIGS. 2A to 2E are schematic diagrams for explaining processes of forming a texture structure of polycrystalline silicon solar cells.

Figure 2A:
FIG. 2A is a schematic diagram for explaining a process of forming a texture structure of polycrystalline silicon solar cells.

A flow of a texture-structure forming process is explained first. A silicon nitride film ($Si_3N_4$ film) is formed on the entire surface of a polycrystalline silicon substrate 11 for polycrystalline silicon solar cells as an etching resistant film 12 that has a resistance to wet etching (FIG. 2A). In addition to the silicon nitride film (the $Si_3N_4$ film), a silicon oxide film ($SiO_2$ film) can be used as the etching resistant film 12.

Figure 2B:
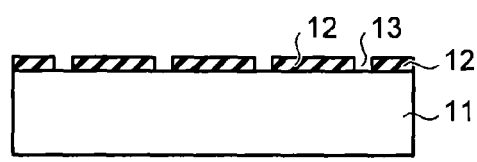
FIG. 2B is a schematic diagram for explaining a process of forming the texture structure of polycrystalline silicon solar cells.
Figure 2C:
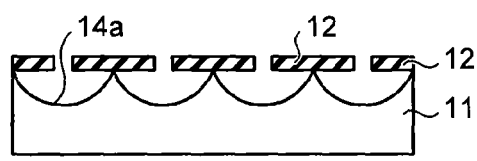
FIG. 2C is a schematic diagram for explaining a process of forming the texture structure of polycrystalline silicon solar cells.
Figure 2D:
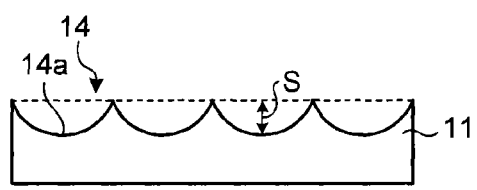
FIG. 2D is a schematic diagram for explaining a process of forming the texture structure of polycrystalline silicon solar cells.
Figure 2E:
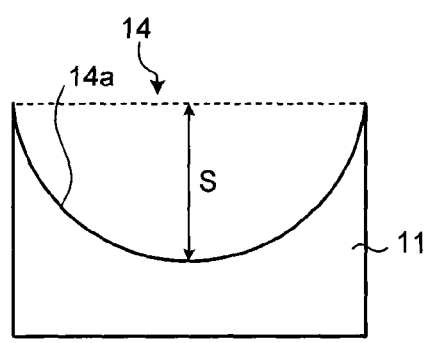
FIG. 2E is a schematic diagram for explaining a process of forming the texture structure of polycrystalline silicon solar cells.

Laser apertures 13 aligned in a geometric periodic structure are then formed in the etching resistant film 12 by the laser processing apparatus of the present embodiment (FIG. 2B). Thereafter, isotropic wet etching is performed on the polycrystalline silicon substrate 11 through the laser apertures 13. Due to the above mentioned fact, regions of the polycrystalline silicon substrate 11 under and near the laser aperture 13 are etched, so that the uneven structure is formed (FIG. 2C). This wet etching ends when adjacent concave parts 14a contact with each other. By removing the etching resistant film 12 finally by an etching method different from the wet etching, a texture structure 14 is formed (FIG. 2D). FIG. 2E is an explanatory diagram of the texture structure 14 and depicts the texture structure 14 in an enlarged manner. In this way, the texture structure 14 can be formed on the surface of the polycrystalline silicon substrate 11.

Unevenness are not directly formed by laser beams. As described above, the laser apertures 13 are formed in the etching resistant film 12 and then the uneven structure is formed on the surface of the polycrystalline silicon substrate 11 by isotropic wet etching. The energy of laser beams can thus be reduced and the number of laser beam splits can be increased. Consequently, high-speed laser processing can be achieved.

Further, when a workpiece is the polycrystalline silicon substrate 11 as described above, the polycrystalline silicon substrate 11 near a laser irradiated part has high temperature because of laser irradiation and thus a region where electric characteristics of the polycrystalline silicon substrate 11 are deteriorated is generated. Because such a region can be removed by wet etching in the present embodiment, deterioration in electric characteristics of the processed polycrystalline silicon substrate 11 can be prevented.

The thickness of the polycrystalline silicon substrate 11 for polycrystalline silicon solar cells is approximately 100 micrometers to 200 micrometers. When the thickness of the polycrystalline silicon substrate 11 is reduced because of the texture structure, a distance that light and the polycrystalline silicon substrate 11 interact with each other is reduced. The photoelectric conversion efficiency is thus reduced. In the texture structure for preventing reflection on the surface of a polycrystalline silicon solar cell, a size S of a concave part (distance between top and bottom of the concave part 14a) is preferably about several tens of micrometers or less than that.

Because the concave part 14a is formed by isotropic wet etching, each of the concave parts 14a of the texture structure is substantially a semi-spherical shape having a flat bottom surface. The bottom surface of the concave part 14a is flat because the region under the laser aperture 13 having a substantial projected area of the laser aperture 13 is etched to be flat by isotropic wet etching. According to the texture structure that can suppress reflected light efficiently by gathering substantially-semi-spherical concave parts 14a, the concave parts 14a are arranged in a triangular lattice pattern that can maximize the number of the concave parts 14a per unit area.

Therefore, the laser apertures 13 are preferably formed in the etching resistant film 12 in a triangular lattice pattern having a pitch (distance between adjacent lattices) within several tens of micrometers. In the present embodiment, a representative value of the pitch is 14 micrometers. The present embodiment is explained below using this value.

Further, because a flat part of the bottom surface of the concave part 14a has inferior reflectance reducing effect, the laser aperture 13 is preferably as small as possible. By reducing a condensed laser beam diameter, the laser aperture 13 can be made small. A typical example of the condensed laser beam diameter (a diameter that enables intensity of $1/e^2$) is defined as φ4 micrometers in the present embodiment.

Figure 3:
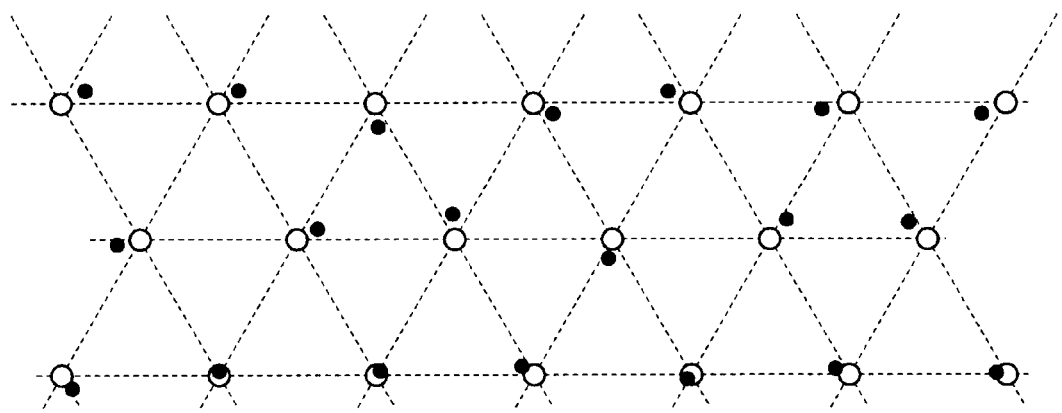
FIG. 3 is a schematic diagram of an example of a laser aperture deviated from a triangular lattice pattern.

FIG. 3 is a schematic diagram of an example of the laser aperture 13 deviated from the triangular lattice pattern. In FIG. 3, a triangular lattice not deviated from the triangular lattice pattern is indicated by a dotted line, the position of the laser aperture 13 not deviated from the triangular lattice pattern is denoted by a white circle, and the laser aperture 13 deviated from the triangular lattice pattern is denoted by a black circle. When the laser aperture 13 is deviated from the triangular lattice pattern, adjacent concave parts 14a are connected to each other at the time of wet etching and a flat part remains on the surface of the polycrystalline silicon substrate 11, so that a reflected-light suppressing effect is reduced. The laser processing apparatus according to the present embodiment can process the laser apertures 13 in such a fine pattern precisely and at a high speed so that its deviation from the triangular lattice pattern is imperceptible with respect to the pitch.

A method of forming the laser aperture 13 on the surface of the polycrystalline silicon substrate 11 by the laser processing apparatus of the present embodiment to form the texture structure is explained.

The workpiece 1 is the etching resistant film 12 formed on the surface of the polycrystalline silicon substrate 11 which is a 156×156-mm square. The laser beam B emitted from the laser oscillator 3 is split into a predetermined periodic pattern by the laser beam splitter 4. The split laser beam B is deflected by the laser beam deflectors 5a and 5b in the two directions (x direction and y direction in FIG. 1) orthogonal to each other. That is, the split laser beam B enters the laser beam deflector 5a, deflected in x direction, and enters the laser beam deflector 5b. The laser beam B that enters the laser beam deflector 5b is deflected and scanned in y direction.

The laser beam B deflected and scanned by the laser beam deflector 5b is condensed by the Fθ lens 6 onto the etching resistant film 12 which is the surface to be processed of the polycrystalline silicon substrate 11. At a part of the etching resistant film 12 irradiated by the laser beam B, the laser aperture 13 is formed in the etching resistant film 12 on the polycrystalline silicon substrate 11 by laser ablation. Because the workpiece conveying unit 2 is moved, the polycrystalline silicon substrate 11 is moved at a constant rate.

Figure 4:
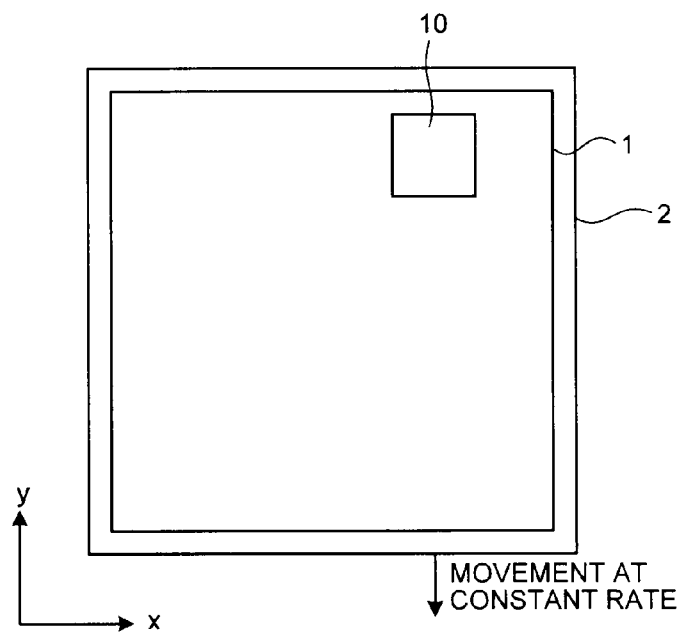
FIG. 4 is a schematic diagram for explaining a processing operation of laser processing of a polycrystalline silicon substrate according to the first embodiment of the present invention.

FIG. 4 is a schematic diagram for explaining a processing operation of laser processing of the polycrystalline silicon substrate 11. When a region that can be processed by the laser beam deflector 5 and the Fθ lens 6 (hereinafter, "processable region 10") is enlarged, high speed processing is possible, but the laser beam B cannot be condensed because of lens aberrations. The processable region 10 thus becomes narrower as the required condensed-light diameter is reduced. The processable region 10 is generally a square region of several tens by several tens of millimeters. In the present embodiment, the processable region 10 is about a 20×20-mm square.

A case of processing the 156×156-mm square shaped polycrystalline silicon substrate 11 in the 20×20-mm square shaped processable region 10 is explained below. According to the present embodiment, the workpiece conveying unit 2 is moved at a constant rate in y direction and laser oscillation is continuously performed simultaneously with laser beam scanning by the laser beam deflector 5, so that laser processing is performed.

Alternatively, the workpiece conveying unit 2 is not moved at a constant rate in y direction, the polycrystalline silicon substrate 11 is moved by the workpiece conveying unit 2 after the processing of the processable region 10 is completed, the 20×20-mm square shaped processable region 10 adjacent to the region where the processing is completed is processed, and such a series of operations is performed repeatedly, so that the polycrystalline silicon substrate 11 is processed. However, according to this method, positioning is required every time the workpiece conveying unit 2 is moved or stopped and thus the process cannot be performed at a sufficient processing rate. By using the laser processing apparatus according to the present embodiment, the time required to process the polycrystalline silicon substrate 11 can be reduced to ½ of the above method or less.

The laser oscillator 3 uses a third harmonic wave of a 100-kHz Q-switch LD-pumped Nd:YAG laser as a repetition frequency. Because the etching resistant film 12 has a relatively high absorption coefficient with respect to the third harmonic wave, the etching resistant film 12 can be processed efficiently by using the third harmonic wave. The laser aperture 13 can be formed in the etching resistant film 12 by using a second harmonic wave or a fundamental wave.

When the third harmonic wave is used, a focal depth at the time of light condensation can be increased because of its short wavelength. Accordingly, while the third harmonic wave is advantageous when the polycrystalline silicon substrate 11 with varying thicknesses is processed, deterioration in optical elements or the like is problematic because the third harmonic wave is ultraviolet ray. When the second harmonic wave or the fundamental wave is used, it is advantageous in initial costs, a lifetime of optics, and reliability. Thus the wavelength may be selected for the laser oscillator 3 in view of the above advantages and disadvantages.

Figure 5:
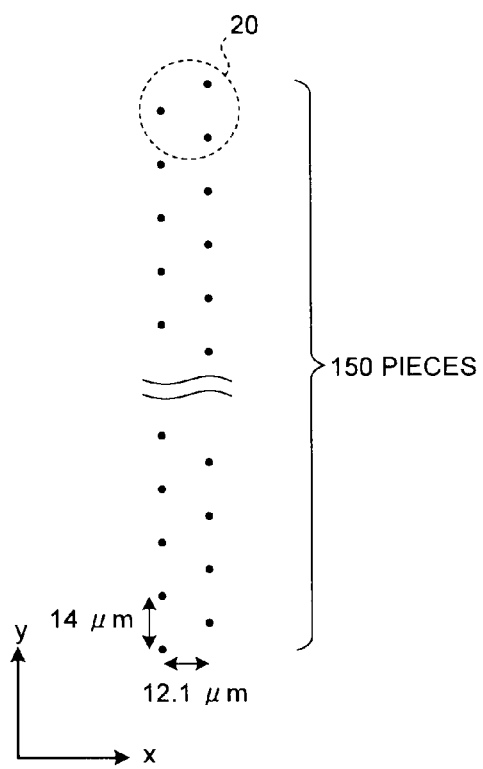
FIG. 5 is a schematic diagram of a split pattern of a laser beam in the first embodiment of the present invention.

A diffractive optical element is used for the laser beam splitter 4. FIG. 5 is a schematic diagram of a split pattern of the laser beam B in the first embodiment. In FIG. 5, the split pattern of the laser beam B is denoted by a black circle. The present embodiment describes an example of splitting the laser beam B into two in x direction and 150 in y direction, that is, into 300 points in total. The split pattern of the laser beam B is a triangular lattice pattern in view of a triangular lattice for forming a texture structure. With reference to FIG. 5, a lattice within a region 20 circled by a dotted line is a unit cell for forming a triangular lattice.

As described above, a laser-beam splitting pattern in view of the triangular lattice pattern with a pitch of 14 micrometers that is the pattern of the laser apertures 13 is provided and all apertures in the split pattern are collectively processed at the same time by a laser pulse. The laser apertures 13 aligned in the triangular lattice with a pitch of 14 micrometers can thus be formed precisely and at a high speed.

The laser beam deflector 5 uses a galvo-mirror to process the relatively narrow, such as 20×20-mm square shaped processable region 10 efficiently. When the galvo-mirror is used, a positional precision of the laser beam B on the workpiece 1 in the case of high speed scanning is about ±10 micrometers. Further, in both cases of using the galvo-mirror and the polygon mirror, when laser oscillation is performed simultaneously with laser beam scanning and the movement of the workpiece conveying unit 2, so that processing is performed as in the present embodiment, misalignment of the laser aperture 13 occurs in a laser-beam scanning direction (x direction) by offset of a synchronous timing of the laser beam scanning, the movement of the workpiece conveying unit 2, and the laser oscillation.

Figure 6:
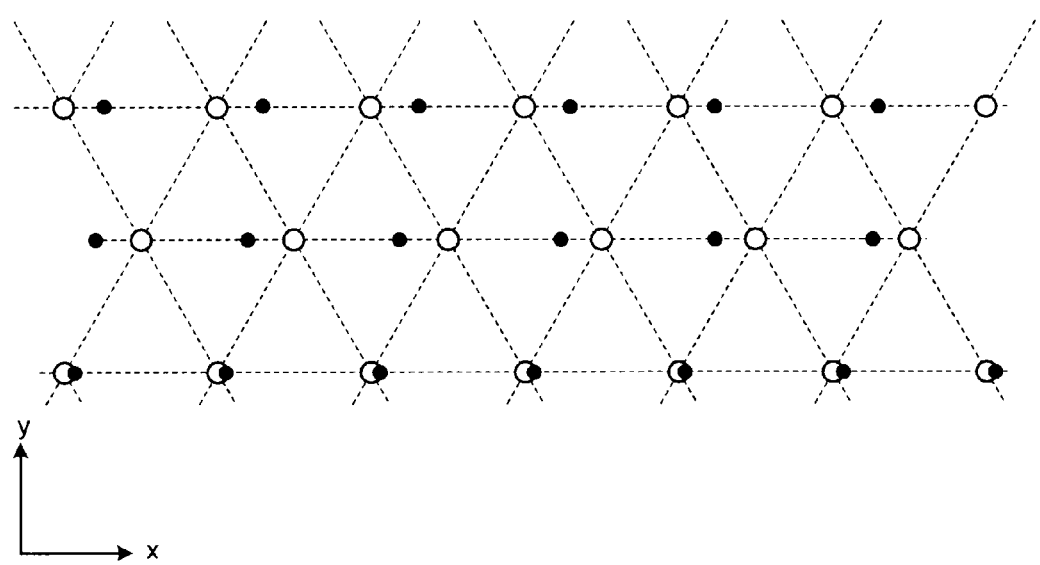
FIG. 6 is a schematic diagram of an example of a laser aperture deviated from a triangular lattice pattern in a laser-beam scanning direction (x direction).

FIG. 6 is a schematic diagram of an example of the laser aperture 13 deviated from the triangular lattice pattern in the laser-beam scanning direction (x direction). In FIG. 6, a triangular lattice that is not deviated from the triangular lattice pattern is indicated by a dotted line, the position of the laser aperture 13 that is not deviated from the triangular lattice pattern is denoted by a white circle, and the laser aperture 13 deviated from the triangular lattice pattern in the laser-beam scanning direction (x direction) is denoted by a black circle. When processing is performed without splitting the laser beam B into patterns, as shown in FIG. 6, the laser aperture 13 having a fine pitch such as a pitch of several tens of micrometers cannot be obtained due to the fact that x-direction positional precision of the laser aperture 13 is at a level of 10 micrometers.

Meanwhile, when processing is performed by the laser-beam splitting pattern that a laser beam is split into 150 in y direction as in the present embodiment, the laser apertures 13 in the triangular lattice pattern that are not deviated within the laser-beam splitting pattern can be obtained. At a connected part of the laser-beam splitting patterns; however, the laser aperture 13 is deviated from the triangular lattice because of offset of a synchronous timing of laser beam scanning, the movement of the workpiece conveying unit 2, and laser oscillation.

Figure 7B:
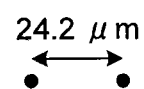
FIG. 7B is an enlarged view of a region 21a shown in FIG. 7A.

FIG. 7A is a schematic diagram for explaining a laser-beam irradiation method in the processable region 10. FIG. 7B is an enlarged view of a region 21a shown in FIG. 7A. In FIG. 7A, the laser-beam splitting pattern is not shown for simplifying explanations and depicts only a locus 21 of a center of the laser beam B (laser beam center). In actual laser processing, the laser aperture 13 is formed by the laser-beam splitting pattern whose center is the laser beam center. That is, for a laser beam center, 300 laser apertures 13 aligned in the triangular-lattice-shaped laser-beam splitting pattern shown in FIG. 5 can be obtained.

FIG. 7A depicts a case that the locus 21 of a laser beam center on the polycrystalline silicon substrate 11 is parallel to a direction (x direction) orthogonal to a direction that the substrate 11 is moved by the workpiece conveying unit 2 at a constant rate (y direction) and is a line-segment sequence that a distance between adjacent loci 21 of a laser beam center is 2.09 millimeters and a length of the locus 21 of a laser beam center (width of the processable region 10) is 20 millimeters. As shown in FIG. 7B, in one locus 21 of a laser beam center, a representative distance between adjacent loci 21 of a laser beam center in x direction is 24.2 micrometers. When the repetition frequency of the laser beam B is 100 kilohertz, a laser pulse interval is 10 microseconds, a scanning rate for scanning 24.2 micrometers in 10 microseconds is 2.42 m/sec, and thus a laser-beam scanning rate in x direction is 2.42 m/sec.

According to the example described above, it can be observed that it takes about 8.3 milliseconds to process once a width of 20 millimeters of the processable region 10. After a line segment is processed, laser oscillation is stopped temporarily and x-direction laser-beam scanning is then performed in the opposite direction. That is, when laser scanning is performed from right to left to process a line segment and then the next line segment is processed, laser beam scanning is performed from left to right.

When a laser beam is not deflected in a direction parallel to the direction that the polycrystalline silicon substrate 11 is moved at a constant rate by the workpiece conveying unit 2 (y direction), the laser beam center is aligned on a locus 22 of a laser beam center when a laser beam is not deflected in y direction of FIG. 7A. Because a line-segment sequence to be processed is parallel to x direction, the laser beam deflector 5 has only to deflect a laser beam by y-direction laser beam deflection by a length indicated by an arrow 23 in FIG. 7A. In other words, it has only to deflect for a distance between the locus 22 of a laser beam center when a laser beam is not deflected in y direction and the locus 21 of a laser beam center. Because the workpiece conveying unit 2 is moved at a constant rate, y-direction laser beam deflection during laser irradiation is scanning at a rate equal to the rate at which the workpiece conveying unit 2 is moved.

When a line segment indicated by a thick solid line (the locus 21 of a laser beam center) shown in section (a) of FIG. 7A is laser-beam-scanned in x direction from left to right so as to be processed and then a line segment indicated by a thick solid line (the locus 21 of a laser beam center) shown in section (b) of FIG. 7A is processed, the laser beam deflector 5 is rotated, while laser oscillation is stopped, from a laser-beam deflection angle at a position indicated by the upward arrow 23 at the right end of the line segment (the locus 21 of a laser beam center) indicated by a thick solid line in section (a) of FIG. 7A to a laser-beam deflection angle at a position indicated by the downward arrow 23 at the right end of the line segment indicated by a thick solid line in section (b) of FIG. 7A. The laser beam deflector 5 performs scanning at a rate equal to the rate at which the workpiece conveying unit 2 is moved simultaneously with the laser oscillation similarly to the case of processing the line segment (the locus 21 of a laser beam center) indicated by a thick solid line in section (a) of FIG. 7A. When line segments (the loci 21 of a laser beam center) indicated by thick solid lines in sections (c) to (e) of FIG. 7A are laser-beam-scanned in x direction, as described above, a laser beam is scanned so that directions are inverted from the ones in the previous scanning in x direction and y direction.

The laser beam deflector 5 inverts y-direction laser-beam deflection and x-direction laser-beam scanning rate while the laser oscillation is stopped. During such a period of time, the workpiece conveying unit 2 is moved in y direction and thus the polycrystalline silicon substrate 11 is moved. In the present embodiment, for example, the time during which laser oscillation is stopped is set to 2.2 milliseconds so that the rate at which the workpiece conveying unit 2 is moved in y direction is 200 mm/sec and the distance between the loci 21 of a laser beam center is 2.09 millimeters.

Because of the above process, the locus 21 of a laser beam center can be arranged in a point sequence whose x direction distance is 24.2 micrometers and whose y direction distance is 2.09 millimeters. By combining these conditions with a laser-beam splitting pattern, the laser apertures 13 aligned in a triangular lattice can be formed.

The laser apertures 13 are formed in the processable region 10 with a width of 20 millimeters, the polycrystalline silicon substrate 11 is then moved by the workpiece conveying unit 2 in x direction by 20 millimeters, the workpiece conveying unit 2 is moved at a constant rate of 200 mm/sec in the opposite direction in y direction, and the laser apertures 13 are formed in the processable region 10 with a width of 20 millimeters. By performing laser processing by a width of 20 millimeters for eight times, the laser apertures 13 are formed on the entire surface of the polycrystalline silicon substrate 11 with a 156×156-mm square shape and a texture structure is formed by isotropic wet etching.

Figure 8:
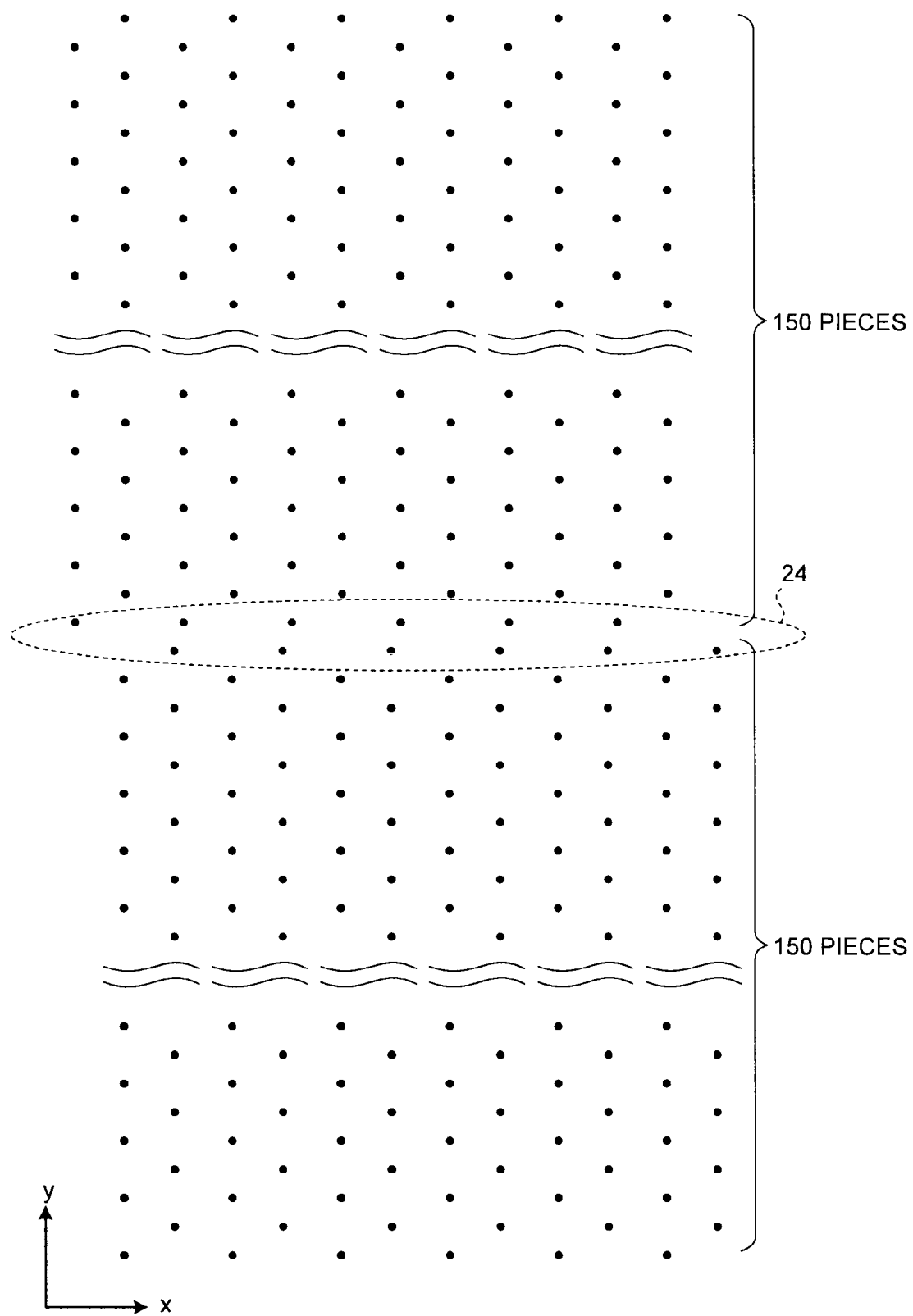
FIG. 8 is a schematic diagram of an example of arranging laser apertures formed by the laser processing apparatus according to the first embodiment of the present invention.

FIG. 8 is a schematic diagram of an example of arranging the laser apertures 13 formed in the laser-beam splitting pattern shown in FIG. 5 by the laser processing apparatus of the first embodiment. In FIG. 8, a region 24 circled by a dotted line ellipse is a connected part of the laser-beam splitting patterns. In this part, the arrangement of the texture structure 14 is disordered and a reflectance reducing effect is thus reduced; however, its influence is sufficiently small such as 1% or less, because this appears at a frequency of a sequence out of 150 y-direction sequences.

While the present embodiment has explained a case of forming the laser apertures 13 aligned in a triangular lattice, the present invention can form the laser apertures 13 aligned in a geometric periodic structure such as a square lattice or a hexagonal lattice and the same effects can be obtained in such a case.

As described above, the laser processing apparatus of the first embodiment includes the laser beam splitter 4 that splits a laser beam into a periodic pattern of a laser beam having a geometric periodic structure. In laser processing in which laser beam scanning is performed simultaneously with the movement of the workpiece 1, the laser apertures 13 aligned in a periodic pattern at a precise pitch can be formed at a high speed in a unit laser-beam periodic pattern. Deviation of the laser apertures 13 from a periodic structure caused by misalignment of laser beam deflection and scanning by the laser beam deflector 5 and offset of synchronous control of laser scanning by the laser beam deflector 5, the conveying of the workpiece 1 by the workpiece conveying unit 2, and laser oscillation, are suppressed, and the apertures 13 aligned in a periodic pattern at a precise pitch as a whole can be processed at a high speed.

Numerical values mentioned in the above explanations are typical ones that can realize the present invention, and it is needless to mention that effects of the present invention are not limited to cases when these numerical values are used.

Second Embodiment

While the first embodiment explains the case of forming a texture structure on the entire surface of the polycrystalline silicon substrate 11 for polycrystalline silicon solar cells, a second embodiment of the present invention explains a case of forming a texture structure in view of an electrode pattern on the surface of a polycrystalline silicon solar cell. Because a laser processing apparatus according to the second embodiment and operations thereof are identical to those of the first embodiment except that a region on the surface of the polycrystalline silicon substrate 11 where a texture structure is formed is different, detailed explanations other than this difference will be omitted.

A texture is not formed only around a part of the surface of a polycrystalline silicon solar cell that contacts a light-incident-side electrode. A fill factor can thus be improved and characteristics of polycrystalline silicon solar cells can thus be improved. Further, this can be utilized for patterning when high-density impurity diffusion is selectively performed on a diffusion layer of the part that contacts a light-incident-side electrode to obtain excellent an ohmic contact.

Figure 9A:
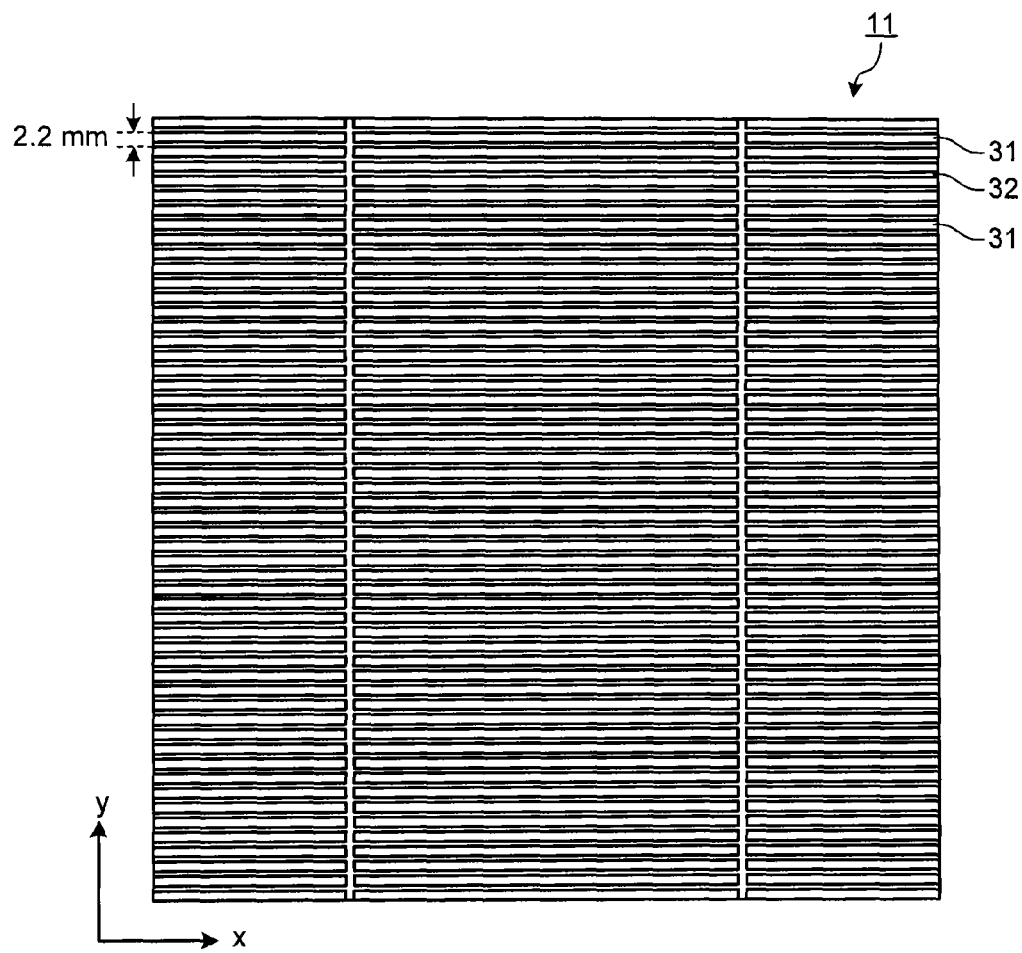
FIG. 9A is a schematic diagram for explaining a region where a texture structure is processed on a surface of a polycrystalline silicon substrate for polycrystalline silicon solar cells according to a second embodiment of the present invention.
Figure 9B:
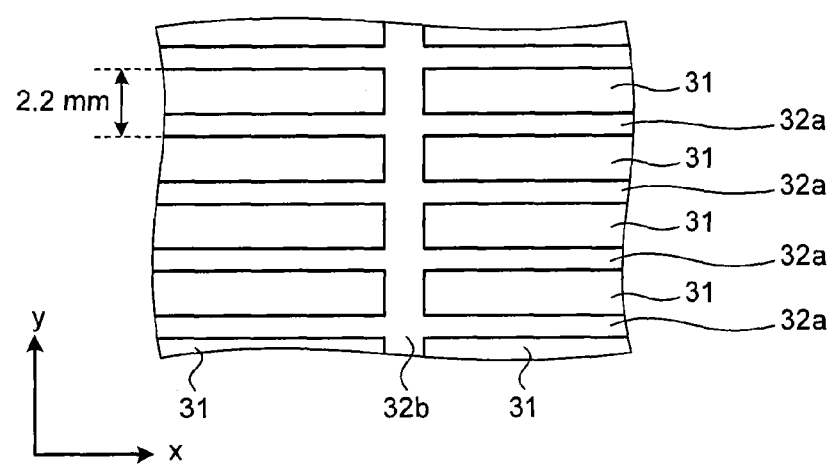
FIG. 9B is a schematic diagram for explaining the region where a texture structure is processed on a surface of the polycrystalline silicon substrate for polycrystalline silicon solar cells according to the second embodiment of the present invention.

FIG. 9A is a schematic diagram for explaining a region where a texture structure is processed on the surface of the polycrystalline silicon substrate 11 for polycrystalline silicon solar cells according to the second embodiment. FIG. 9B is a schematic diagram for explaining the region where a texture structure is processed on the surface of the polycrystalline silicon substrate 11 for polycrystalline silicon solar cells according to the second embodiment, and FIG. 9B depicts the region where a texture structure is processed shown in FIG. 9A in an enlarged manner. As shown in FIGS. 9A and 9B, a texture is not formed in an electrode forming region 32 where an electrode is formed after a texture forming process on the surface of the polycrystalline silicon substrate 11 but only in a texture forming region 31 between the electrode forming regions 32.

The electrode forming region 32 is a region where 70 grid electrodes are formed and is constituted by a grid-electrode forming region 32a parallel to a side of the square-shaped polycrystalline-silicon substrate 11 and a region 32b where two bus electrodes are formed orthogonal to the grid electrode. That is, the laser apertures 13 are not formed in the electrode forming region 32 but only in the texture forming region 31. The texture is formed by isotropic wet etching. Because the electrode forming region 32 where the laser apertures 13 are not formed is not etched by isotropic wet etching, this region becomes a flat region. A method of forming the laser apertures 13 in the texture forming region 31 is explained below.

A case of forming the laser apertures 13 aligned in a triangular lattice with a pitch of 14 micrometers when y direction pitch of the electrode forming region 32 is 2.2 millimeters and y direction width of the electrode forming region 32 is 200 micrometers is explained.

The number of laser beam splits by the laser beam splitter 4 is 143 (y direction)×2 (x direction)=286. A width that can be processed by laser beam scanning is about 2 millimeters. When processing is performed according to the laser-beam splitting pattern while y direction distance between laser beam centers is 2.2 millimeters, a flat region with a width of 200 micrometers is obtained.

Similarly to the first embodiment, the laser processing is performed such that the laser beam B is deflected simultaneously with the movement of the polycrystalline silicon substrate 11 by the workpiece conveying unit 2, a repetition frequency of laser beams is 100 kilohertz, x-direction laser-beam scanning rate is 2.42 m/sec, and the rate at which the workpiece conveying unit 2 is moved and y-direction laser-beam scanning rate are about 210 mm/sec. As compared to the first embodiment, the rate at which the workpiece conveying unit 2 is moved is increased and thus y direction distance between laser beam centers is 2.2 millimeters.

Because the positional precision of laser-beam splitting patterns adjacent to each other in y direction is inferior in the first embodiment, the region where the laser aperture 13 is deviated from a triangular lattice exists. Meanwhile, because the electrode forming region 32 where the laser apertures 13 are not formed exists in the second embodiment, laser-beam splitting patterns are not adjacent to each other in y direction.

With this configuration, the region where the laser aperture 13 is deviated from triangular lattice pattern does not exist.

When the electrode forming region 32 is formed at an equal y-direction distance in this manner, a laser-beam splitting pattern is set to a value obtained by subtracting y direction width of the electrode forming region 32 from the pitch of the electrode forming region 32 and the texture forming region 31 between adjacent electrode forming regions 32 is processed by performing laser beam scanning once. The laser beam scanning is performed once on a first texture forming region 31 by such a method and then is performed once on a second texture forming region 31 adjacent to the first texture forming region 31 with the electrode forming region 32 that is an unprocessed region not subjected to laser beam scanning interposed therebetween. The laser beam scanning on the first texture forming region 31 and the second texture forming region 31 is defined as a unit process, and by repeating this unit process for plural times on the entire surface of the etching resistant film 12, the laser apertures 13 aligned in a geometric periodic structure at a precise pitch can be obtained on the entire surface of the etching resistant film 12.

As described above, similarly to the first embodiment, the laser beam splitter 4 that splits a laser beam into a periodic pattern of a laser beam with a geometric periodic structure is provided in the second embodiment. In the laser processing for performing laser beam scanning simultaneously with the movement of the workpiece 1, the laser apertures 13 aligned in a periodic pattern at a precise pitch can be formed at a high speed in a unit laser-beam periodic pattern. Deviation of the laser apertures 13 from a periodic structure caused by misalignment of laser beam deflection and scanning by the laser beam deflector 5 and offset of synchronous control of the laser scanning by the laser beam deflector 5, the conveying of the workpiece 1 by the workpiece conveying unit 2, and laser oscillation are thus suppressed. The apertures 13 aligned in the periodic pattern at a precise pitch can be processed at a high speed.

Further, according to the second embodiment, the electrode forming region 32 where the laser aperture 13 is not formed is provided at an equal pitch and a region between the electrode forming regions 32 is processed by laser beam scanning once by the laser beam deflector 5. Accordingly, laser-beam splitting patterns are not adjacent to each other in y direction and the region where the laser aperture 13 is deviated from the triangular lattice pattern does not occur. Therefore, the laser apertures 13 can be formed in a pattern having an equal pitch in all desired regions regardless of deviation of the laser apertures 13 from the periodic structure caused by misalignment of laser beam deflection and scanning by the laser beam deflector 5 and offset of synchronous control of the laser scanning by the laser beam deflector 5, the conveying of the workpiece 1 by the workpiece conveying unit 2, and the laser oscillation.

Also in the present embodiment, numerical values mentioned in the above explanations are typical ones that can realize the present invention, and it is needless to mention that effects of the present invention are not limited to cases when these numerical values are used.

INDUSTRIAL APPLICABILITY

As described above, the laser processing apparatus according to the present invention is useful for forming apertures aligned in a geometric periodic structure.

REFERENCE SIGNS LIST

1 WORKPIECE
2 WORKPIECE CONVEYING UNIT
3 LASER OSCILLATOR
4 LASER BEAM SPLITTER
5 LASER BEAM DEFLECTOR
5a LASER BEAM DEFLECTOR
5b LASER BEAM DEFLECTOR
6 CONDENSER (Fθ LENS)
10 PROCESSABLE REGION
11 POLYCRYSTALLINE SILICON SUBSTRATE
12 ETCHING RESISTANT FILM
13 LASER APERTURE
14 TEXTURE STRUCTURE
14a CONCAVE PART
21 LOCUS OF CENTER OF LASER BEAM (LASER BEAM CENTER)
22 LOCUS OF LASER BEAM CENTER WHEN LASER BEAM IS NOT DEFLECTED IN y DIRECTION
23 ARROW
31 TEXTURE FORMING REGION
32 ELECTRODE FORMING REGION
32a GRID-ELECTRODE FORMING REGION
32b BUS-ELECTRODE FORMING REGION

The invention claimed is:

1. A laser processing apparatus comprising:
a workpiece conveying unit that holds a workpiece with a surface to be processed thereof facing upward and conveys the workpiece at a constant rate in one direction;
a laser oscillator that emits a pulsed laser beam;
a laser beam splitter that splits the pulsed laser beam emitted from the laser oscillator into a pattern of a laser beam having a predetermined geometric pitch;
a first laser beam deflector that scans the pulsed laser beam split by the laser beam splitter in the other direction substantially orthogonal to the one direction on the surface to be processed;
a second laser beam deflector that adjusts and deflects the split pulsed laser beam deflected by the first laser beam deflector in the one direction on the surface to be processed so as to scan a resultant laser beam onto the surface to be processed at a constant rate equal to a rate at which the workpiece is conveyed; and
a condenser that condenses the split pulsed laser beam deflected by the second laser beam deflector onto the surface to be processed.

2. The laser processing apparatus according to claim 1, wherein the pulsed laser beam is oscillated at a constant frequency when the pulsed laser beam is scanned.

* * * * *